(12) United States Patent
Lightner et al.

(10) Patent No.: US 9,619,571 B2
(45) Date of Patent: Apr. 11, 2017

(54) METHOD FOR SEARCHING RELATED ENTITIES THROUGH ENTITY CO-OCCURRENCE

(71) Applicant: QBASE, LLC, Reston, VA (US)

(72) Inventors: Scott Lightner, Leesburg, VA (US); Franz Weckesser, Spring Valley, OH (US); Sanjay Boddhu, Dayton, OH (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/557,989

(22) Filed: Dec. 2, 2014

(65) Prior Publication Data

US 2015/0154306 A1 Jun. 4, 2015

Related U.S. Application Data

(60) Provisional application No. 61/910,894, filed on Dec. 2, 2013.

(51) Int. Cl.
*G06F 7/00* (2006.01)
*G06F 17/30* (2006.01)
*G06F 17/00* (2006.01)

(52) U.S. Cl.
CPC .... *G06F 17/30867* (2013.01); *G06F 17/3002* (2013.01); *G06F 17/30312* (2013.01); *G06F 17/30699* (2013.01); *G06F 17/30946* (2013.01)

(58) Field of Classification Search
CPC ........... G06F 17/3002; G06F 17/30312; G06F 17/30946; G06F 17/30867; G06F 17/30699
USPC ........................................................ 707/741
See application file for complete search history.

(56) References Cited

U.S. PATENT DOCUMENTS

| | | | |
|---|---|---|---|
| 6,128,660 A | 10/2000 | Grimm et al. | |
| 6,173,298 B1 * | 1/2001 | Smadja ........................ | 715/209 |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,738,759 B1 | 5/2004 | Wheeler et al. | |
| 6,832,373 B2 | 12/2004 | O'Neill | |
| 6,832,737 B2 | 12/2004 | Karlsson et al. | |
| 7,058,846 B1 | 6/2006 | Kelkar et al. | |
| 7,370,323 B2 | 5/2008 | Marinelli et al. | |

(Continued)

FOREIGN PATENT DOCUMENTS

WO 2013/003770 A2 1/2013

OTHER PUBLICATIONS

International Search Report dated Apr. 15, 2015 corresponding to International Patent Application No. PCT/US2014/067997, 4 pages.

(Continued)

*Primary Examiner* — Kannan Shanmugasundaram
(74) *Attorney, Agent, or Firm* — Eric L. Sophir; Dentons US LLP

(57) ABSTRACT

A method for searching for related entities using entity co-occurrence is disclosed. Embodiments of the method may be employed in any search system that may include at least one search engine, at least one entity co-occurrence knowledge base, an entity extraction module, and at least an entity indexed corpus. The method may extract and disambiguate entities from search queries by using an entity co-occurrence knowledge base, find extracted entities in an entity indexed corpus and finally present search results as related entities of interest.

18 Claims, 3 Drawing Sheets

(56) References Cited

U.S. PATENT DOCUMENTS

| | | |
|---|---|---|
| 7,421,478 B1 | 9/2008 | Muchow |
| 7,447,940 B2 | 11/2008 | Peddada |
| 7,543,174 B1 | 6/2009 | van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 2001/0037398 A1 | 11/2001 | Chao et al. |
| 2002/0165847 A1 | 11/2002 | McCartney et al. |
| 2002/0174138 A1 | 11/2002 | Nakamura |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0027349 A1 | 2/2004 | Landau et al. |
| 2004/0049478 A1 | 3/2004 | Jasper et al. |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2005/0192994 A1 | 9/2005 | Caldwell et al. |
| 2006/0101081 A1 | 5/2006 | Lin et al. |
| 2006/0129843 A1 | 6/2006 | Srinivasa et al. |
| 2006/0294071 A1 | 12/2006 | Weare et al. |
| 2007/0005639 A1 | 1/2007 | Gaussier et al. |
| 2007/0013967 A1* | 1/2007 | Ebaugh ............. G06F 17/30613 358/448 |
| 2007/0203693 A1 | 8/2007 | Estes |
| 2007/0203924 A1 | 8/2007 | Guha et al. |
| 2007/0240152 A1 | 10/2007 | Li et al. |
| 2007/0250501 A1* | 10/2007 | Grubb et al. ..................... 707/5 |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027915 A1 | 1/2008 | Karasudani et al. |
| 2008/0027920 A1 | 1/2008 | Schipunov et al. |
| 2008/0306908 A1 | 12/2008 | Agrawal et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Bruckner et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1 | 4/2011 | Brockway et al. |
| 2011/0119243 A1 | 5/2011 | Diamond et al. |
| 2011/0125764 A1 | 5/2011 | Carmel et al. |
| 2011/0282888 A1 | 11/2011 | Koperski et al. |
| 2011/0296397 A1 | 12/2011 | Vidal et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0143875 A1 | 6/2012 | Sarma et al. |
| 2012/0246154 A1 | 9/2012 | Duan et al. |
| 2012/0310934 A1 | 12/2012 | Peh et al. |
| 2012/0323839 A1 | 12/2012 | Kiciman et al. |
| 2012/0323923 A1* | 12/2012 | Duan ................ G06F 17/30486 707/741 |
| 2013/0132405 A1 | 5/2013 | Bestgen et al. |
| 2013/0144605 A1 | 6/2013 | Brager et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2013/0311485 A1 | 11/2013 | Khan |
| 2014/0013233 A1 | 1/2014 | Ahlberg et al. |
| 2014/0022100 A1 | 1/2014 | Fallon et al. |
| 2014/0046921 A1* | 2/2014 | Bau .............................. 707/706 |
| 2014/0156634 A1 | 6/2014 | Buchmann et al. |
| 2014/0244550 A1 | 8/2014 | Jin et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154264 A1 | 6/2015 | Lightner et al. |
| 2015/0154297 A1 | 6/2015 | Lightner et al. |

OTHER PUBLICATIONS

Written Opinion of the International Searching Authority dated Apr. 15, 2015 corresponding to International Patent Application No. PCT/US2014/067997, 9 pages.

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion of the International Searching Authority dated Feb. 24, 2015 corresponding to International Patent Application No. PCT/US2014/067918, 10 pages.

International Search Report and Written Opinion of the International Searching Authority dated Mar. 3, 2015 corresponding to International Patent Application No. PCT/US2014/067921, 10 pages.

Tunkelang, D. "Faceted Search," Morgan & Claypool Publ., 2009, pp. i-79.

Schuth, A., et al., "University of Amsterdam Data Centric Ad Hoc Faceted Search Runs," ISLA, 2012, pp. 155-160.

Tools, Search Query Suggestions using ElasticSearch via Shingle Filter and Facets, Nov. 2012, pp. 1-12.

\* cited by examiner

METHOD FOR SEARCHING RELATED ENTITIES THROUGH ENTITY CO-OCCURRENCE

CROSS-REFERENCE TO RELATED APPLICATIONS

This application is related to U.S. patent application Ser. No. 14/557,794, entitled "METHOD FOR DISAMBIGUATED FEATURES IN UNSTRUCTURED TEXT," filed Dec. 2, 2014, now U.S. Pat. No. 9,239,875 issued Jan. 19, 2016, U.S. patent application Ser. No. 14/558,300, entitled "EVENT DETECTION THROUGH TEXT ANALYSIS USING TRAINED EVENT TEMPLATE MODELS,", filed Dec. 2, 2014, now U.S. Pat. No. 9,177,254 issued Nov. 3, 2015; each of which are hereby incorporated by reference in their entirety.

TECHNICAL FIELD

The present disclosure relates generally to methods and systems for information retrieval, and more specifically to a method for searching for related entities using entity co-occurrence.

BACKGROUND

In the commercial context, a well known search engine parses a set of search terms and returns a list of items (web pages in a typical search) that are sorted in some manner. Most known approaches, to perform searches, are usually based on historical references of other users to build a search query database that may be eventually used to generate indexes based on keywords. User search queries may include one or more entities identified by name or attributes that may be associated with the entity. Entities may also include organizations, people, location, date and/or time. In a typical search, if a user is searching for information related to two particular organizations, a search engine may return assorted results that may be about a mixture of different entities with the same name or similar names. The latter approach may lead the user to find a very large amount of documents that may not be relevant to what the user is actually interested.

Thus, a need exists for a method for searching for related entities that may grant the user the ability to find related entities of interest.

SUMMARY

A method for searching for related entities using entity co-occurrence is disclosed. In one aspect of the present disclosure, the method may be employed in a search system that may include a client/server type architecture. In one embodiment, the search system may include a user interface for a search engine in communication with one or more server devices over a network connection. The server device may include an entity indexed corpus of electronic data, an entity co-occurrence knowledge base database, and an entity extraction computer module. The knowledge base may be built as an in-memory database and may also include other components such as one or more search controllers, multiple search nodes, collections of compressed data, and a disambiguation module. One search controller may be selectively associated with one or more search nodes. Each search node may be capable of independently performing a fuzzy key search through a collection of compressed data and returning a set of scored results to its associated search controller.

In one embodiment, a computer-implemented method comprises receiving, by an entity extraction computer, from a client computer a search query comprising one or more entities; comparing, by the entity extraction computer, each respective entity with one or more co-occurrences of the respective entity in a co-occurrence database; extracting, by the entity extraction computer, a subset of the one or more entities from the search query responsive to determining each respective entity of the subset exceeds a confidence score of the co-occurrence database based on a degree of certainty of co-occurrence of the entity with one or more related entities in an electronic data corpus according to the co-occurrence database; assigning, by the entity extraction computer, an index identifier (index ID) to each of the entities in the plurality of extracted entities; saving, by the entity extraction computer, the index ID for each of the plurality of extracted entities in the electronic data corpus, the electronic data corpus being indexed by an index ID corresponding to each of the one or more related entities; searching, by a search server computer, the entity indexed electronic data corpus to locate the plurality of extracted entities and identify index IDs of data records in which at least two of the plurality of extracted entities co-occur; and building, by the search server computer, a search result list having data records corresponding to the identified index IDs.

In one embodiment, a system comprising one or more server computers having one or more processors executing computer readable instructions for a plurality of computer modules including: an entity extraction module configured to receive user input of search query parameters, the entity extraction module being further configured to: extract a plurality of entities from the search query parameters by comparing each entity in the plurality of extracted entities with an entity co-occurrence database that includes a confidence score indicative of a degree of certainty of co-occurrence of an extracted entity with one or more related entities in an electronic data corpus, assign an index identifier (index ID) to each of the entities in the plurality of extracted entities, save the index ID for each of the plurality of extracted entities in the electronic data corpus, the electronic data corpus being indexed by an index ID corresponding to each of the one or more related entities; and a search server module configured to search the entity indexed electronic data corpus to locate the plurality of extracted entities and identify index IDs of data records in which at least two of the plurality of extracted entities co-occur, the search server module being further configured to build a search result list having data records corresponding to the identified index IDs.

In another embodiment, a non-transitory computer readable medium having stored thereon computer executable instructions comprising: receiving, by an entity extraction computer, user input of search query parameters; extracting, by the entity extraction computer, a plurality of entities from the search query parameters by comparing each entity in the plurality of extracted entities with an entity co-occurrence database that includes a confidence score indicative of a degree of certainty of co-occurrence of an extracted entity with one or more related entities in an electronic data corpus; assigning, by the entity extraction computer, an index identifier (index ID) to each of the entities in the plurality of extracted entities; saving, by the entity extraction computer, the index ID for each of the plurality of extracted entities in the electronic data corpus, the electronic data corpus being indexed by an index ID corresponding to each of the one or more related entities; searching, by a search server computer, the entity indexed electronic data corpus to locate the plurality of extracted entities and identify index IDs of data records in which at least two of the plurality of extracted entities co-occur; and building, by the search server computer, a search result list having data records corresponding to the identified index IDs.

DEFINITIONS

As used here, the following terms may have the following definitions:

"Entity extraction" refers to computer information processing methods for extracting electronic information such as names, places, and organizations.

"Corpus" refers to a collection, such as a computer database, of electronic data, including documents.

"Features" is any information which is at least partially derived from an electronic document.

"Feature attribute" refers to metadata associated with a feature; for example, location of a feature in a document, confidence score, among others.

"Module" refers to a computer hardware and/or software components suitable for carrying out at least one or more tasks.

"Fact" refers to objective relationships between features.

"Entity knowledge base" refers to a computer database containing features/entities.

"Query" refers to a computer generated request to retrieve information from one or more suitable databases.

"Topic" refers to a set of thematic information which is at least partially derived from a corpus.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
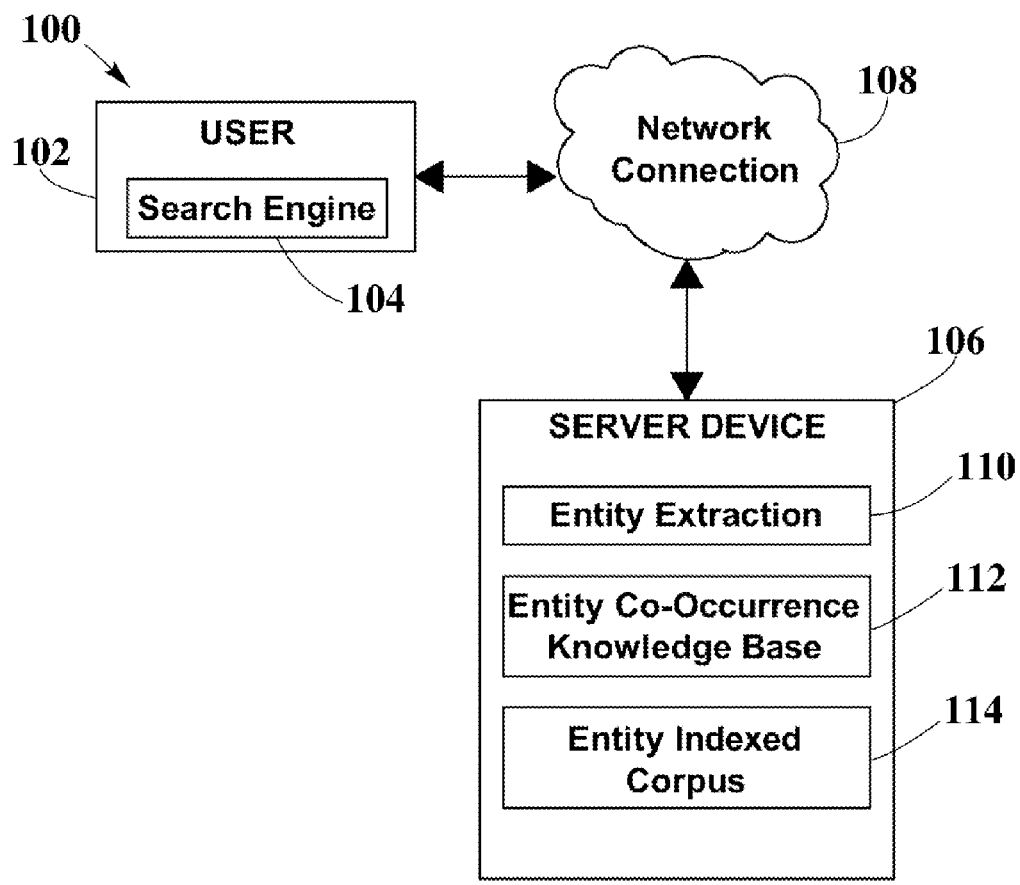
FIG. 1 is a block diagram illustrating an exemplary environment of a computer system in which one embodiment of the present disclosure may operate.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Embodiments of the present disclosure introduce a new search paradigm which grants users the ability to find entities of interest via entity co-occurrence. An important component of this approach is an entity co-occurrence network captured in an entity indexed corpus of electronic data, which is continuously updated as new information is discovered. Moreover, embodiments of the present disclosure incorporate entity extraction and disambiguation, using an entity knowledge base. By exploiting the entity co-occurrence network and disambiguating entities extracted from search queries, the high relevance of search results is ensured so that users obtain precise and direct results containing only the documents with related entities of interest, as discussed in further detail in FIGS. 1-3 below.

FIG. 1 is a block diagram of a search system 100 in accordance with the present disclosure. The search system 100 may include one or more client computing device comprising a processor executing software modules associated with the search system 100, which may include graphical user interfaces 102 accessing a search engine 104 communicating search queries in the form of binary data with a server device 106, over a network 108. In the exemplary embodiment, the search system 100 may be implemented in a client-server computing architecture. However, it should be appreciated that the search system 100 may be implemented using other computer architectures (e.g., a stand-alone computer, a mainframe system with terminals, an application service provider (ASP) model, a peer-to-peer model, and the like). The network 108 may comprise any suitable hardware and software modules capable of communicating digital data between computing devices, such as a local area network, a wide area network, the Internet, a wireless network, a mobile phone network, and the like. As such, it should also be appreciated that the system 100 may be implemented over a single network 108, or using a plurality of networks 108.

A user's computing device 102 may access a search engine 104, which may include software modules capable of transmitting search queries. Search queries are parameters provided to the search engine 104 indicating the desired information to retrieve. Search queries may be provided by a user or another software application in any suitable data format (e.g., integers, strings, complex objects) compatible with the search engine's 104 parsing and processing routines. In some embodiments, the search engine 104 may be a web-based tool that is accessible through the user's computing device 102 browser or other software application, and enables users or software applications to locate information on the World Wide Web. In some embodiments, the search engine 104 may be application software modules native to the system 100, enabling users or applications to locate information within databases of the system 100.

Server device 106, which may be implemented as a single server device 106 or in a distributed architecture across a plurality of server computers, may include an entity extraction module 110, an entity co-occurrence knowledge base 112, and an entity indexed corpus 114. Entity extraction module 110 may be a computer software and/or hardware module able to extract and disambiguate independent entities from a given set of queries such as a query string, structured data and the like. Example of entities may include people, organizations, geographic locations, dates and/or time. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

According to various embodiments, entity co-occurrence knowledge base 112 may be built, but is not limited to, as an in-memory computer database (not shown) and may include other components (not shown), such as one or more search controllers, multiple search nodes, collections of compressed data, and a disambiguation computer module. One search controller may be selectively associated with one or more search nodes. Each search node may be capable of independently performing a fuzzy key search through a collection of compressed data and returning a set of scored results to its associated search controller.

Entity co-occurrence knowledge base 112 may include related entities based on features and ranked by a confidence score. Various methods for linking the features may be employed, which may essentially use a weighted model for determining which entity types are most important, which have more weight, and, based on confidence scores, determine how confident the extraction of the correct features has been performed. Entity indexed corpus 114 may include data from a plurality of sources such as the Internet having a massive corpus or live corpus.

Figure 2:
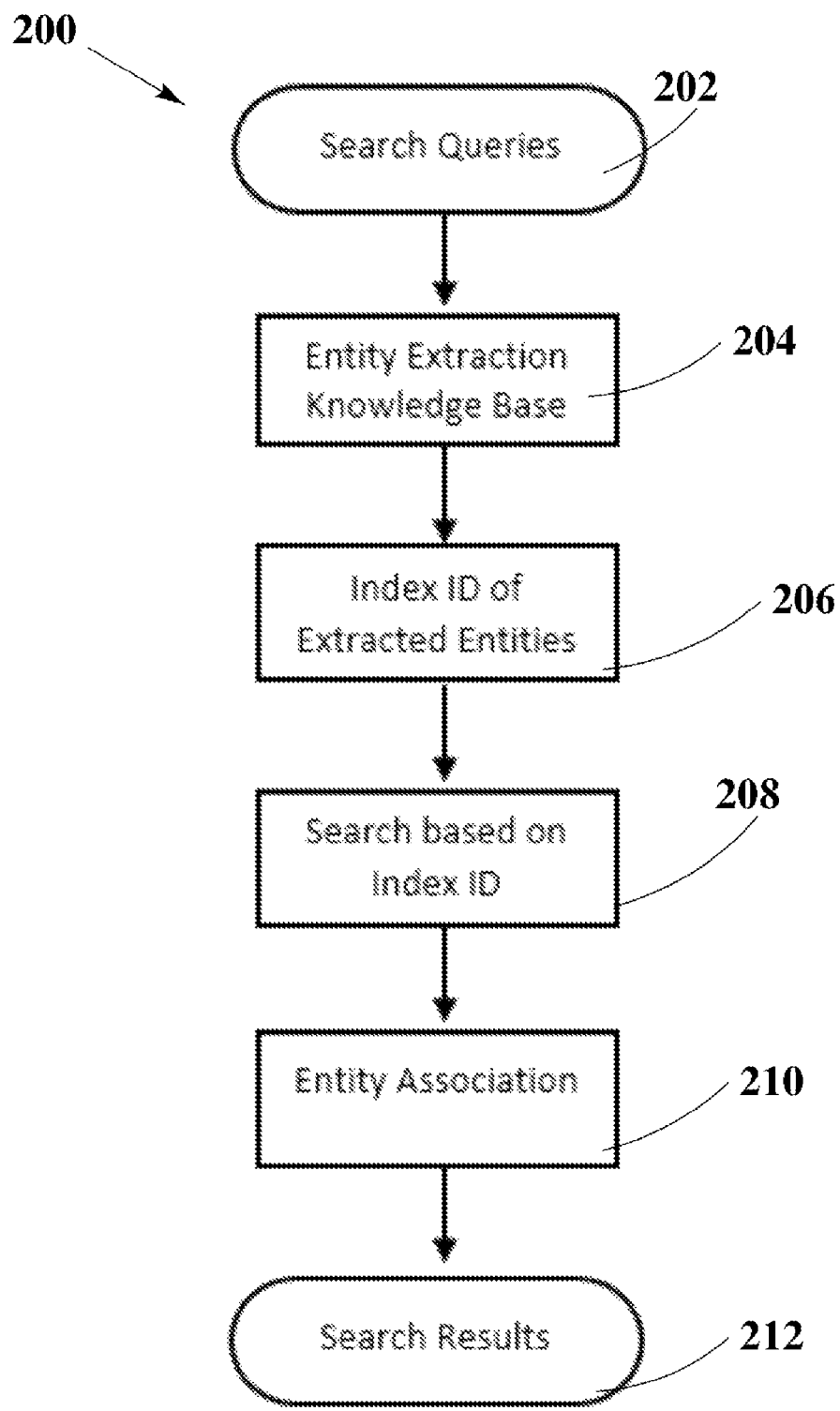
FIG. 2 is a flowchart illustrating a method for searching using entity co-occurrence, according to an embodiment.

FIG. 2 is a flowchart illustrating a method 200 for searching related entities using entity co-occurrence that may be implemented in a search system 100, such as the one described in FIG. 1. According to various embodiments, prior to start of method 200, an entity indexed corpus 114 similar to that described by FIG. 1 may have been fed with data from a plurality of sources such as a massive corpus or live corpus of electronic data (e.g., the Internet, website, blog, word-processing file, plaintext file). Entity indexed corpus 114 may include a plurality of indexed entities that may constantly update as new data is discovered.

In one embodiment, method 200 may start when a user or software application of a computing device 102 provides one or more search queries containing one or more entities to a search engine 104, in step 202. Search queries that were provided in step 202 may be processed by search system 100, from one to n, at each time. An example of a search query in step 202 may be a combination of keywords, such as a string, structured data, or other suitable data format. In this exemplary embodiment of FIG. 2, the keywords of the search query may be entities that represent people, organizations, geographic locations, dates and/or times.

Search queries from step 202 may then be processed for entity extraction, in step 204. In this step, the entity extraction module 110 may process search queries from step 202 as entities and compare them all against entity co-occurrence knowledge base 112 to extract and disambiguate as many entities as possible. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

Furthermore, various methods for linking the features may be employed, which may essentially use a weighted model for determining which entity types are most important, which have more weight, and, based on confidence scores, determine how confident the extraction of the correct features has been performed. Once the entities are extracted and ranked based on confidence scores, an index ID, which in some cases may be a number, may be assigned in step 206 to the extracted entities.

Next, in step 208, a search based on the entities index ID assigned in step 206 may be performed. In the search step 208, the extracted entities may be located within the entity indexed corpus 114 data by using standard indexing methods. Once the extracted entities are located, an entity association step 210 may follow. In the entity association step 210, all the data such as documents, videos, pictures, files or the like, where at least two extracted entities overlaps may be pulled from the entity indexed corpus 114. Finally, a list of potential results is built, sorted by relevance, and presented to the user as search results, step 212. The list of results may then show only links to data where the user may find related entities of interest.

Figure 3:
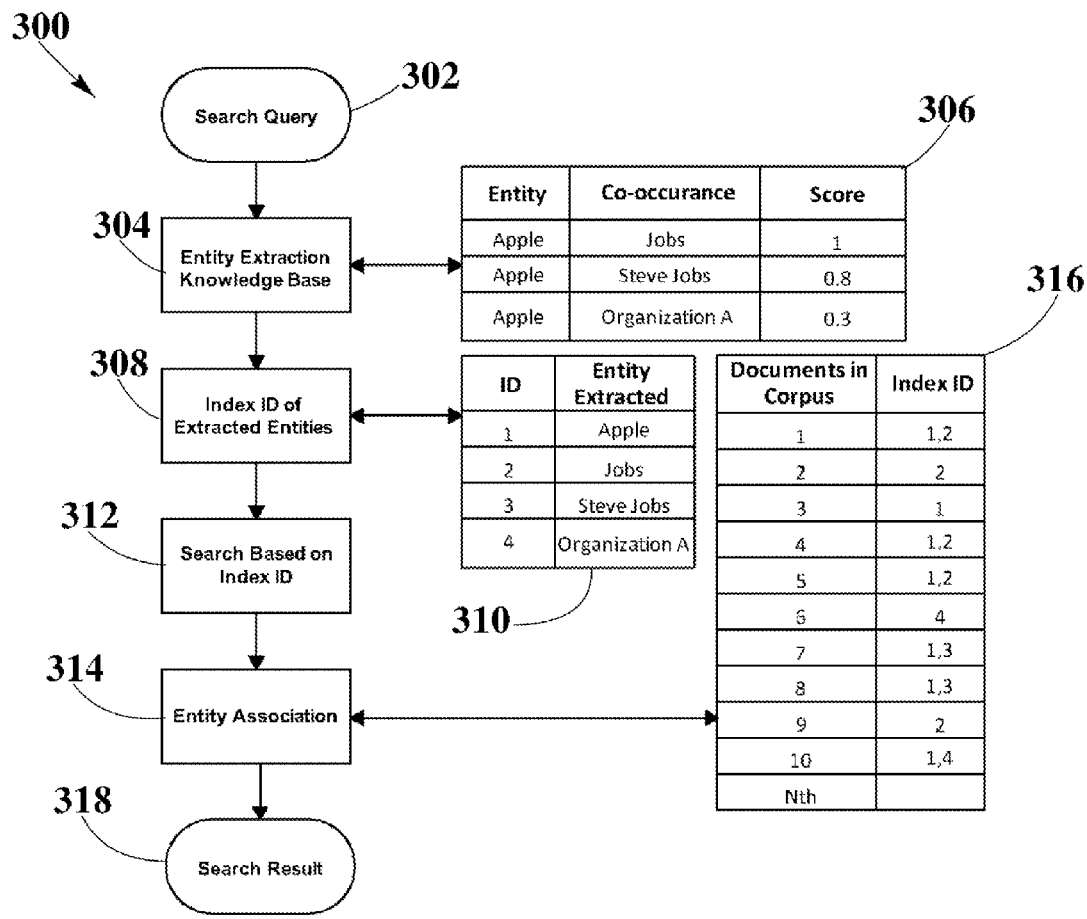
FIG. 3 is a flowchart illustrating an embodiment of a simple search where the search results returned by the system may include related entities of interest.

FIG. 3 is a particular example of a method 300 for searching related entities using entity co-occurrence, as discussed above in connection with FIG. 2. As described in FIG. 2, according to various embodiments, prior to the start of the method 300, an entity indexed corpus 114 similar to that described by FIG. 1, may have been fed with data from a plurality of sources such as a massive corpus or live corpus (the Internet). Entity indexed corpus 114 may include a plurality of indexed entities that may constantly update as new data is discovered.

In this example embodiment, a user may be looking for information regarding "jobs" at the company "Apple". For this, the user may input one or more entities (e.g., search queries in step 302) through a user interface 102 which may be, but is not limited to, an interface with a search engine 104, such as the one described in FIG. 1. By a way of illustration and not by way of limitation, the user may input a combination of entities such as "Apple+Jobs". Next, the search engine 104 may generate search queries, step 302, and send these queries to server device 106 to be processed. At server device 106, entity extraction module 110 may perform an entity extraction step 304 from search queries input in step 302.

Entity extraction module 110 may then process search queries that were input in step 302, such as "Apple" and "Jobs", as entities and compare them all against entity co-occurrence knowledge base 112 to extract and disambiguate as many entities as possible. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

Furthermore, various methods for linking the features may be employed, which may essentially use a weighted model for determining which entity types are most important, which have more weight, and, based on confidence scores, determine how confident the extraction of the correct features has been performed. As a result, a table 306 including entity and co-occurrences may be created. Table 306 may then show the entity "apple" and its co-occurrences, which in this case, may be Apple and Jobs, Apple and Steve Jobs. The table 306 may also include Apple and organization A which may have been found relevant because Organization A is doing business with Apple and generating "jobs" in said organization A. Other co-occurrences may be found with less importance. As such, Apple and Jobs may then have the highest score (1), thus listed at the top, then Apple and Steve Jobs may have the second highest score (0.8), and finally Apple and other organization A may be at the bottom list with the lowest score (0.3).

Once the entities are extracted and ranked based on confidence scores, an index ID, which in some cases may be a number, may be assigned in step 308 to the extracted entities. Table 310 shows index IDs assigned to extracted entities. Table 310 then shows "Apple" with index ID 1, "Jobs" with index ID 2, "Steve Jobs" with index ID 3, and "Organization A" with index ID 4.

Next, a search step 312 based on the entities index ID 308 may be performed. In the search step 312, the extracted entities such as "Apple", "Jobs", "Steve Jobs", and "Organization A", may be located within the entity indexed corpus 114 data by using standard indexing methods.

After locating extracted entities within the entity indexed corpus 114, an entity association 314 step may follow. In Entity association step 314, all the data such as documents, videos, pictures, files or the like, where at least two extracted entities overlaps may be pulled from the entity indexed corpus 114 to build a list of links as search results (step 318). By a way of illustration and not by way of limitation, table 316 shows how extracted entities may be associated to data in entity indexed corpus 114. In table 316, documents 1, 4, 5, 7, 8, and 10 show overlapping of two extracted entities, thus the links for these documents may be shown as search results in step 318.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
receiving, by an entity extraction computer, from a client computer a search query comprising one or more entities;
comparing, by the entity extraction computer, each respective entity with one or more co-occurrences of the respective entity in a co-occurrence in-memory database, wherein the co-occurrence database comprises one or more entries for the one or more entities, and wherein each entry for the respective entity of the one or more entities contains a semantically-related entity that identifies the respective entity, and wherein the co-occurrence is an instance of an entity of the one or more entities identified by the semantically-related entity in the corpus of documents in the co-occurrence database, and wherein the semantically-related entity corresponds to a model indicating distinct entities;
extracting, by the entity extraction computer, a subset of the one or more entities from the search query responsive to determining each respective entity of the subset exceeds a confidence score of the co-occurrence database based on a degree of certainty of co-occurrence of the entity with one or more related entities in an electronic data corpus according to the co-occurrence database;
assigning, by the entity extraction computer, an index identifier (index ID) to each of the entities in the plurality of extracted entities;
disambiguating, by the entity extraction computer, each of the entities in the plurality of extracted entities from one another based on relatedness of index IDs;
identifying, by the entity extraction computer, a subset of entities associated with each of the entities in the plurality of extracted entities based on relatedness of index IDs;
linking, by the entity extraction computer, each entity to the associated subset of entities based at least on confidence scores;
saving, by the entity extraction computer, the index ID for each of the plurality of extracted entities in the electronic data corpus, the electronic data corpus being indexed by an index ID corresponding to each of the one or more related entities;
searching, by a search server computer, the entity indexed electronic data corpus to locate the plurality of extracted entities and identify index IDs of data records in which at least two of the plurality of extracted entities co-occur; and
building, by the search server computer, a search result list having data records corresponding to the identified index IDs.

2. The method of claim 1 further comprising sorting, by the search server computer, the search result list by relevance based on the confidence score and forwarding, by the search server computer, the sorted search result list to a user device.

3. The method of claim 1 wherein the plurality of extracted entities is ranked based on the confidence score.

4. The method of claim 1 wherein the entity extraction computer associates an extracted entity with one or more co-occurring entities in the entity indexed electronic data corpus.

5. The method of claim 4 wherein the associated entities are ranked by the confidence score.

6. The method of claim 1 wherein each of the plurality of entities is selected from the group consisting of a person, an organization, a geographic location, a date, and a time.

7. A system comprising:
one or more server computers having one or more processors executing computer readable instructions for a plurality of computer modules including:
an entity co-occurrence in-memory database comprising one or more entries for each of the plurality of entities, and wherein each entry of the one or more entries for a given entity of the plurality of entities contains its semantically related entities; and
an entity extraction module configured to receive user input of search query parameters, the entity extraction module being further configured to:
extract a plurality of entities from the search query parameters by comparing each respective entity in the plurality of extracted entities with the entity co-occurrence database that includes a confidence score indicative of a degree of certainty of co-occurrence of an extracted entity with one or more related entities in an electronic data corpus, wherein the co-occurrence is an instance of the respective entity identified by the semantically-related entity in the one or more entries for the respective entity in the co-occurrence database, and wherein the semantically-related entity corresponds to a model indicating distinct entities,
assign an index identifier (index ID) to each of the entities in the plurality of extracted entities,
disambiguate each of the entities in the plurality of extracted entities from one another based on relatedness of index IDs;
identify a subset of entities associated with each of the entities in the plurality of extracted entities based on relatedness of index IDs;
link each entity to the associated subset of entities based at least on confidence scores;
save the index ID for each of the plurality of extracted entities in the electronic data corpus, the electronic data corpus being indexed by an index ID corresponding to each of the one or more related entities; and
a search server module configured to search the entity indexed electronic data corpus to locate the plurality of extracted entities and identify index IDs of data records in which at least two of the plurality of extracted entities co-occur, the search server module being further configured to build a search result list having data records corresponding to the identified index IDs.

8. The system of claim 7 wherein the search server module is further configured to sort the search result list by relevance based on the confidence score and forward the sorted search result list to a user device.

9. The system of claim 7 wherein the plurality of extracted entities is ranked based on the confidence score.

10. The system of claim 7 wherein the entity extraction module is configured to associate an extracted entity with one or more co-occurring entities in the entity indexed electronic data corpus.

11. The system of claim 10 wherein the associated entities are ranked by the confidence score.

12. The system of claim 7 wherein each of the plurality of entities is selected from the group consisting of a person, an organization, a geographic location, a date, and a time.

13. A non-transitory computer readable medium having stored thereon computer executable instructions comprising:
receiving, by an entity extraction computer, user input of search query parameters;
extracting, by the entity extraction computer, a plurality of entities from the search query parameters by comparing each entity in the plurality of extracted entities with an entity co-occurrence in-memory database that includes a confidence score indicative of a degree of certainty of co-occurrence of an extracted entity with one or more related entities in an electronic data corpus, wherein the entity co-occurrence database further comprises one or more entries for the plurality of entities, and wherein each entry of the one or more entries for a given entity of the plurality of entities contains its semantically related entities, and wherein the co-occurrence is an instance of an entity of plurality of entities identified by an entry of the one or more entries in the entity co-occurrence database, and wherein the semantically-related entity corresponds to a model indicating distinct entities,
assigning, by the entity extraction computer, an index identifier (index ID) to each of the entities in the plurality of extracted entities;
disambiguating, by the entity extraction computer, each of the entities in the plurality of extracted entities from one another based on relatedness of index IDs;
identifying, by the entity extraction computer, a subset of entities associated with each of the entities in the plurality of extracted entities based on relatedness of index IDs;
linking, by the entity extraction computer, each entity to the associated subset of entities based at least on confidence scores;
saving, by the entity extraction computer, the index ID for each of the plurality of extracted entities in the electronic data corpus, the electronic data corpus being indexed by an index ID corresponding to each of the one or more related entities;
searching, by a search server computer, the entity indexed electronic data corpus to locate the plurality of extracted entities and identify index IDs of data records in which at least two of the plurality of extracted entities co-occur; and
building, by the search server computer, a search result list having data records corresponding to the identified index IDs.

14. The computer readable medium of claim 13 wherein the instructions further comprise sorting, by the search server computer, the search result list by relevance based on the confidence score and forwarding, by the search server computer, the sorted search result list to a user device.

15. The computer readable medium of claim 13 wherein the plurality of extracted entities is ranked based on the confidence score.

16. The computer readable medium of claim 13 wherein the instructions further comprise associating, by the entity extraction computer, an extracted entity with one or more co-occurring entities in the entity indexed electronic data corpus.

17. The computer readable medium of claim 16 wherein the associated entities are ranked by the confidence score.

18. The computer readable medium of claim 13 wherein each of the plurality of entities is selected from the group consisting of a person, an organization, a geographic location, a date, and a time.

* * * * *